3,458,562
PALLADIUM CATALYZED REACTION OF 1,2-ALKADIENES WITH 1-ALKYNES

George D. Shier, Midland, Mich., assignor to The Dow Chemical Company, Midland, Mich., a corporation of Delaware
No Drawing. Filed Mar. 22, 1967, Ser. No. 624,986
Int. Cl. C07c 3/60, 67/04, 3/10
U.S. Cl. 260—497          9 Claims

ABSTRACT OF THE DISCLOSURE 1,2-alkadienes react with 1-alkynes in the presence of a palladium II salt and an organic carboxylic acid to form addition products with a conjugated double and triple bond. These products are reactive monomers and synthetic intermediates.

BACKGROUND

The reaction of allene and 1-alkyne in the presence of certain nickel catalysts to form dimethylenecyclohexenes is described in Benson U.S. Patent 2,943,116. Also in U.S. Patent 3,262,969, Clark and Hayden describe the preparation of glycol esters by reaction of an alkene with a carboxylic acid in the presence of a complex palladium catalyst. Esters have also been prepared from allene and carbon monoxide using a transition metal catalyst.

SUMMARY OF THE INVENTION

A novel catalytic reaction has been discovered wherein a 1,2-alkadiene (I) reacts with a 1-alkyne (II) in the presence of (A) a palladium salt $Pd(Y)_{2/m}$ wherein Y is a weak coordinating anion of valence $m$, and (B) an organic carboxylic acid $R''COOH$ to form an addition product (III) with a conjugated double and triple bond, e.g.

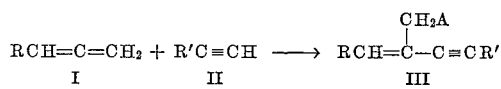

wherein R and R' individually are H or $C_1$–$C_3$ alkyl, and A is H or —OOCR'. For example, reaction of allene and methylacetylene with a solution of palladium nitrate and potassium acetate in acetic acid gives a mixture of unsaturated hydrocarbons and esters including 2-methylpent-1-ene-3-yne and 2-acetoxymethylpent-1-ene-3-yne. These products are reactive monomers and synthetic intermediates.

CATALYST

The process requires as a catalyst a palladium salt $Pd(Y)_{2/m}$ wherein Y is a weak coordinating anion such as acetate, benzoate, nitrate, perchlorate, sulfate, fluoroborate, benzenesulfonate, tosylate or hexafluorophosphate. Particularly desirable is palladium nitrate or the palladium salt of the organic carboxylic acid used as a coreactant, e.g., $Pd(OOCR'')_2$. Indeed when another palladium salt is used, in situ formation of the carboxylate salt is probable. However, salts of anions which coordinate strongly with palladium, e.g., chloride, bromide, cyanide, thiocyanate and similar anions with a nitrogen, sulfur or halogen donor atom, are inactive catalysts. In fact, the system must be kept free of such anions since they deactivate the catalyst through preferential coordination of the palladium.

The organic carboxylic acid ($R''COOH$) is a second essential element in the process. Many carboxylic acids can be used, but particularly desirable are liquid carboxylic acids which function both as a reactant and as a solvent. Suitable aliphatic acids include acetic acid, propionic acid, succinic acid, hexanoic acid, adipic acid and stearic acid. Aromatic mono- and dicarboxylic acids including benzoic, terephthalic and o-phthalic acid can also be used. In general $C_1$–$C_8$ mono- and dicarboxylic acids are preferred.

HYDROCARBON REACTANTS

Allene and 1,2-alkadienes of the formula

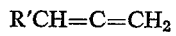

wherein R' is $C_1$–$C_3$ alkyl react readily in this process. As the coreactant, acetylene and $C_1$–$C_3$ alkylacetylenes including methylacetylene can be used. Since simple olefins such as propylene and butylene are essentially inert under normal process conditions, mixtures of a 1,2-alkadiene or a 1-alkyne and such olefins are suitable.

PROCESS CONDITIONS

Reaction occurs most readily when the reactants and catalyst are in solution. Excess acetic or other liquid carboxylic acid is a particularly effective reaction medium. However, water, methanol, n-butyl alcohol, p-dioxane, dimethylsulfoxide and other non-halogen containing liquid can be employed as a solvent or diluent, particularly with a solid acid.

Often it is advantageous to add an alkali metal carboxylate as a buffer against any strong acid. Preferably, soluble sodium or potassium salt of the organic carboxylic acid is used. Indeed, the buffer can be formed in situ by partial neutralization of the carboxylic acid with an appropriate alkali metal base.

Normally, the reactor is charged with the palladium salt, organic carboxylic acid and any necessary other solvent or diluent to give a final concentration of about 1–1000 p.p.m. of the palladium salt and about 0.1–10 parts of the carboxylic acid per part of total hydrocarbon reactants. When a buffer is used, a ratio of about 1–5 moles of alkali metal carboxylate per mole of palladium is desirable. A moderate excess of 1,2-alkadiene can be used, but an excess of 1-alkyne is not as desirable as the reaction rate is significantly reduced.

Reaction occurs readily at 0–100° C. and preferably at about 30–80° C., in the absence of oxygen. Depending particularly on the catalyst concentration and temperature, the reaction may require from several hours to several days.

The resulting alkadiene-alkyne adduct is usually a mixture containing both a hydrocarbon and an ester with a conjugated double and triple bond. Although the individual compounds can be separated by careful fractionation, the mixture is itself reactive as a monomer and synthetic intermediate. Because of their facile polymerization, excessive heating and contact with air should be avoided and conventional monomer stabilizers such as 2,5-dinitro-o-cresol and t-butylcatechol are advantageously added in a small amount. Also the ester is readily converted into the corresponding alcohol useful in the synthesis of unsaturated esters.

This invention is further illustrated by the following examples. Unless otherwise specified, all parts and percentages are by weight.

Example 1.—Reaction of allene and methylacetylene (A) A stainless steel bomb was charged with a solution of 0.25 part (1.0 mmole) palladium nitrate dihydrate, 0.5 part (5 mmoles) potassium acetate, 0.25 part o-phthalic acid, 0.1 part 3,5-dinitrocatechol and 55 parts acetic acids. The bomb was evacuated, cooled to $-78°$ C. and 12 parts (0.30 mole) methylacetylene and 36 parts (0.90 mole) allene added. Conversion after agitation at 65° C. for 64 hours was essentially quantitative.

After washing with water and drying, the organic product was distilled and the following allene-methylacetylene adducts recovered: 2.7 parts 2-methylpent-1-ene-3-yne, B.P. 77-8° C., and 4 parts 2-acetoxymethylpent-1-ene-3-yne, B.P. 51° C./1 mm. These adducts were identified by their IR and NMR spectra showing conjugated double and triple bond unsaturation, two non-equivalent methyl groups, a pair of methylene protons and for the ester the two protons of the ester methylene group. Elemental analyses were in accord with the assigned structures. In addititon to the allenemethylacetylene adducts, products from the dimerization of allene were also found.

(B) In a series of runs using the general procedure of Part A, varying mixtures of allene and methylacetylene were reacted at 65° C. for 16 hours. Typical results based on consumed allene and methylacetylene are shown in Table 1. Note also that the methylacetylene not only reacts with the allene, but also promotes other reactions of allene including dimerization. The product composition in each run was analyzed by vapor phase chromatography and found to a mixture of the compounds identified in 1A.

TABLE 1.—REACTION OF ALLENE AND METHYLACETYLENE

| Run | Allene (pts.) | Methylacetylene (pts.) | Percent reaction [1] |
|---|---|---|---|
| B-1 | 12 | 0 | 31 |
| B-2 | 11.4 | 0.6 | 82 |
| B-3 | 10.8 | 1.2 | 85 |
| B-4 | 8.1 | 3.3 | 100 |
| B-5 | 6 | 6 | 50 |

[1] Based on consumed hydrocarbons after 16 hours at 65° C.

Example 2.—Reaction of allene and 1-butyne in

The procedure of Example 1A was repeated with the substitution of 0.20 part palladium acetate for the palladium nitrate and 18 parts (0.33 mole) of 1-butyne for the methylacetylene. The product was a mixture including about 7 parts of 2-methylhex-1-ene-3-yne and about 1.5 parts of 2-acetoxymethylhex-1-ene-3-yne isolated by distillation and identified by IR and NMR spectra.

I claim:
1. A process for the preparation of a compound of the formula:

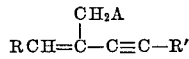

$$RCH=\overset{CH_2A}{C}-C\equiv C-R'$$

wherein R and R' individually are H or $C_1$-$C_3$ alkyl and A is H, or —OOCR'' which comprises contacting:
(A) a 1,2-alkadiene of the formula $RCH=C=CH_2$ wherein R is H or $C_1$-$C_3$ alkyl, and
(B) a 1-alkyne of the formula $R'C\equiv CH$ wherein R' is H or $C_1$-$C_3$ alkyl, with
(C) a mixture comprising
(1) a palladium salt of the formula $Pd(Y)_{2/m}$ where Y is a weak coordinating anion of valence $m$, and
(2) a hydrocarbon carboxylic acid R''COOH for a time sufficient to form said compound at 0°–100° C.

2. The process of claim 1 wherein the 1,2-alkadiene is allene.
3. The process of claim 1 wherein the 1-alkyne is methylacetylene.
4. The process of claim 1 wherein the 1-alkyne is 1-butyne.
5. The process of claim 1 wherein the palladium salt is palladium nitrate or the palladium salt of the organic carboxylic acid, $Pd(OOCR'')_2$.
6. The process of claim 1 wherein the carboxylic acid is a $C_1$-$C_8$ aliphatic acid.
7. The process of claim 1 wherein the carboxylic acid is acetic acid.
8. The process of claim 1 wherein about 1–5 moles of an alkali metal carboxylate is incorporated with the mixture of the palladium salt and organic carboxylic acid.
9. The process of claim 1 wherein a mixture of allene and methylacetylene is reacted at about 30–80° C. with a solution of palladium acetate in acetic acid containing about 1.0–4.0 moles of potassium acetate per mole of palladium to form a mixture containing 2-methylpent-1-ene-3-yne and 2-acetoxymethylpent-1-ene-3-yne.

References Cited
UNITED STATES PATENTS 3,394,170  7/1968  Kohll _____ 260—491
3,407,224  10/1968  Smutny _____ 260—476

LORRAINE A. WEINBERGER, Primary Examiner

V. GARNER, Assistant Examiner

U.S. Cl. X.R.
260—410.9, 475, 476, 485, 666, 678, 680